United States Patent
Pollard

(10) Patent No.: US 8,151,680 B2
(45) Date of Patent: Apr. 10, 2012

(54) BAND SAW APPARATUS

(76) Inventor: Levi A. Pollard, Appling, GA (US)

(*) Notice: Subject to any disclaimer, the term of this patent is extended or adjusted under 35 U.S.C. 154(b) by 0 days.

(21) Appl. No.: 12/382,322

(22) Filed: Mar. 13, 2009

(65) Prior Publication Data
US 2009/0173205 A1    Jul. 9, 2009

Related U.S. Application Data

(62) Division of application No. 11/409,995, filed on Apr. 25, 2006, now abandoned.

(51) Int. Cl.
*B27B 13/00* (2006.01)
*B23D 55/00* (2006.01)
(52) U.S. Cl. ............................... 83/820; 83/13
(58) Field of Classification Search .................. 83/814, 83/820, 514, 808, 819, 788, 804, 803, 806
See application file for complete search history.

(56) References Cited

U.S. PATENT DOCUMENTS

| | | | | |
|---|---|---|---|---|
| 1,827,490 A * | 10/1931 | Spencer | | 30/369 |
| 1,916,903 A * | 7/1933 | Wine | | 83/820 |
| 3,363,495 A * | 1/1968 | Turnbull | | 83/13 |
| 3,465,794 A * | 9/1969 | McLauchlan et al. | | 83/420 |
| 3,491,816 A * | 1/1970 | Harrison | | 83/805 |
| 3,540,334 A * | 11/1970 | McLauchlan | | 83/13 |
| 3,593,763 A * | 7/1971 | Neild | | 83/169 |
| 4,061,066 A * | 12/1977 | Mueller | | 83/808 |
| 4,128,031 A * | 12/1978 | Sato | | 83/820 |
| 5,001,957 A * | 3/1991 | Steckler | | 83/792 |
| 5,557,989 A | 9/1996 | Smith, Jr. | | |
| 5,819,613 A | 10/1998 | Wilson | | |
| 6,745,644 B1 | 6/2004 | Iseli | | |

* cited by examiner

*Primary Examiner* — Ghassem Alie
(74) *Attorney, Agent, or Firm* — Jeffrey S. Melcher; Manelli Selter PLLC

(57) ABSTRACT

A band saw includes a drive wheel and a fixed, curved band saw guide surface having one or more tracks for one or more band saw continuous strips. The one or more tracks contains lubricant openings which are accessed from a source of lubricant under pressure to reduce frictional resistance of the band saw moving over the guide surface.

9 Claims, 5 Drawing Sheets

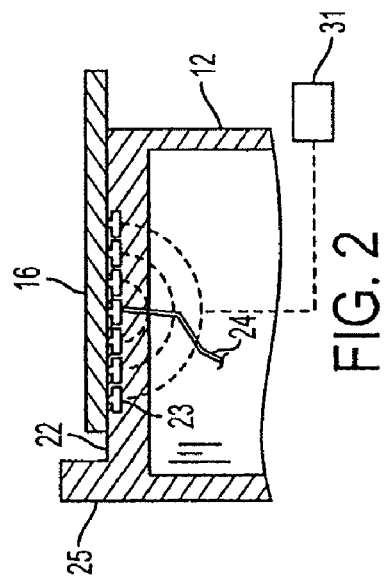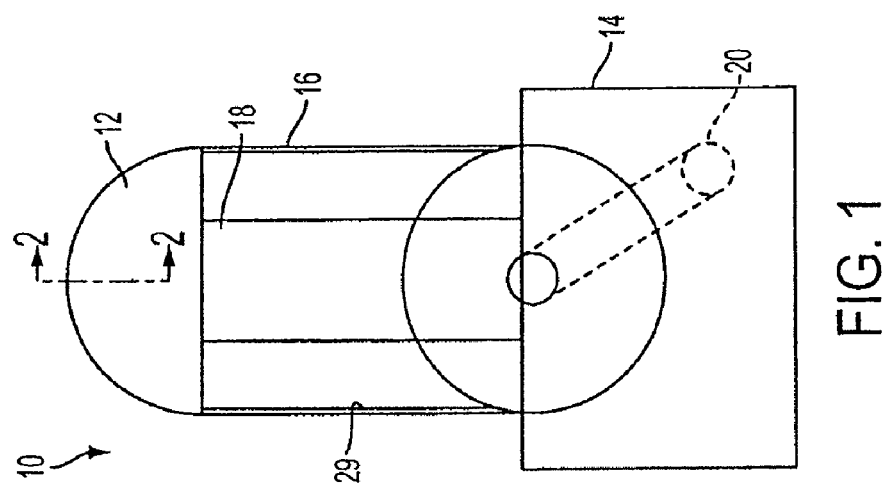

BAND SAW APPARATUS

This is a divisional application of National application Ser. No. 11/409,995 filed Apr. 25, 2006 now abandoned and currently pending.

FIELD OF THE INVENTION

The present invention relates to an improvement in a band saw apparatus and, particularly, a simplification of the apparatus including replacement of the conventional, upper idler wheel with a low friction guide surface. This arrangement will enhance the control of the tension in the band saw as well as reduce the expense in constructing and operating such machinery.

BACKGROUND OF THE INVENTION

In the lumber industry, a number of apparatuses have been employed to cut timber into usable pieces for subsequent operations or usage. Frequently, a wood cant must be cut into fairly thin but elongated pieces and typically band saws are used to accomplish this operation. In conventional band saws, such as represented by U.S. Pat. Nos. 4,061,066, issued Dec. 6, 1977, 6,745,644, issued Jun. 8, 2004, 5,557,989, issued Sep. 24, 1996 and 5,819,613, issued Oct. 13, 1998, an endless band saw is looped around an idler pulley wheel and a drive wheel which is motor driven and operated at high speed to rotate the drive wheel and, hence, the band saw over the pulley wheel while cants or wooden pieces are transported by a conveyor or manually against the cutting teeth of the band saw. Tension on the band saw is maintained by adjusting the distance between the central axis of rotation of the pulley and the drive wheel. The maintenance of the proper tension in the band saw loop is critical to efficient cutting operation and the avoidance of damage to the band saw loop. In particular, an improper low tension will result in wastage of the wood product since vibration of the loop will increase the size of the kerfs or cut made in the wood and can lead to breakage of the band itself.

SUMMARY OF THE INVENTION

In the present invention, the rotatable idler pulley is eliminated and replaced by a low friction curved guide member that has one or more guide tracks for individual band saw loops. The drive wheel, which is typically but not always located vertically below the surface, provided by the present invention may be formed with a corresponding number of tracks to enhance guidance of the band saw or saws. In addition, the drive wheel may be provided with sprocket teeth on the track surfaces to cooperate with sprocket openings formed along one edge of the band saw opposite the edge on which the cutting teeth are formed. Further, the guide track surface or each guide track surface of the curved guide member is formed with a number of lubricating openings connected to a source of lubricant under pressure or continuous grooves which will also be supplied with a lubricant under pressure. Air under pressure may also be provided with the lubricant so that the band saw moving over the guide track surface will encounter as little friction resistance as possible.

One advantage of the arrangement of the present invention is the simplification of a band saw apparatus since the guide track surface will require substantially less maintenance then the idler pulley currently in use. Also, typically the idler pulleys presently in use are relatively heavy as compared with the guide track surface used in the present invention. The weight saving may significantly extend the life of the drive motor for the drive pulley. Additionally, the use of a fixed guide track surface will allow the introduction of closely adjacent, multiple loop tracks which will be spaced apart at the cutting site by virtue of the different radii of each of the tracks as will become apparent from the following description. Further, the use of the stationary guide track surface will reduce vibrations in the band saw during use and thereby result in a reduced kerf size and will allow thinner cutting to be accomplished.

The foregoing and other advantages will become apparent as consideration is given to the follow detailed description taken in conjunction with the accompanying drawings, in which:

BRIEF DESCRIPTION OF THE DRAWINGS

FIG. 1 is a schematic view in side elevation of the apparatus of the present invention;

FIG. 2 is a view along lines 2-2 of FIG. 1;

DETAILED DESCRIPTION OF THE INVENTION

Figure 4:
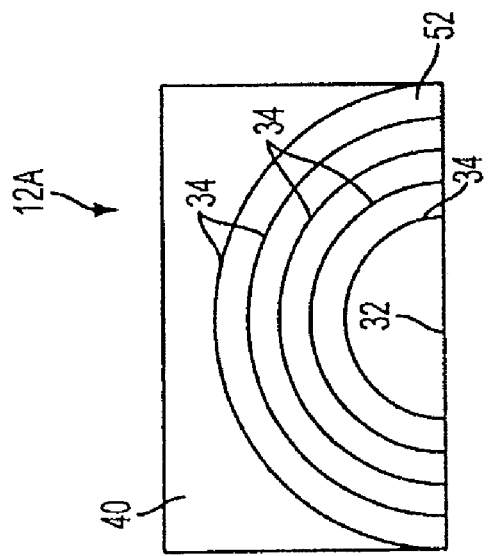
FIG. 4 is a side view in elevation of a further alternate embodiment of the invention.

Referring to the drawings, wherein like numerals designate corresponding parts throughout the several views, there is shown schematically in FIG. 1, a band saw generally designated at 10 which includes an upper located guide member 12, a vertical support arm 18 extending from a base 14 which houses a motor 20 shown in broken lines which drives which drives a drive wheel which is rotatably mounted on an axle carried by the base 14. A conventional band saw 16 which is in the form of a continuous loop extends over the curved surface of the guide member 12 and around the drive wheel in a closed path, wherein the closed path includes a rectilinear section to allow access by a workpiece to the band saw's 16 cutting teeth 62. To effect cutting, a workpiece, or piece of timber, will be fed against the cutting edge of the band saw 16, at position 29, on a conveyor (not shown) typically on one side of the drive wheel and guide member 12.

As shown in the enlarged sectional view of FIG. 2, the guide member 12 is provided with a guide track 22 and, on one side of the guide track 22 there is provided a guide shoulder 25 to insure retention of the band saw 16 on the guide track surface and in a stable position relative to a plurality of lubricating openings or grooves formed in the guide track surface. A number of techniques are available for reducing friction and assuring smooth operation and passage of the band saw over the smoothly arcuate guide track surface. For example, in one form, the guide track surface may be provided with a plurality of grooves 23 spaced apart along the width of the guide track surface and extending along at least a portion of the path of travel of the band saw 16. A lubricant may be fed under pressure through one or more tubes 24a to continuously lubricate the underside of the band saw 16.

Alternatively, the lubricant, such as a hydraulic fluid, may be mixed with air under pressure and pumped to the groove chambers 23 underlying the groove openings on the guide track surface.

Figure 3:
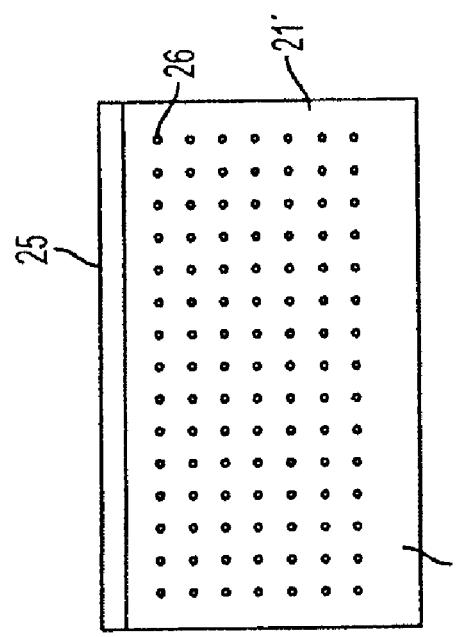
FIG. 3 is a top plan view similar to FIG. 1 of an alternative embodiment.

An alternative structure is illustrated in the top plan view of FIG. 3, where in place of the elongated grooves, multiple rows of openings 26 may be provided to extend across the width of the guide track surface. Similar to the embodiment of FIG. 2, each of these openings 26 will be provided with access to a hydraulic fluid under pressure such as through tubes 24 which will be connected to a supply source 200 via a pump 31, which may also supply pressurized air with the hydraulic fluid to the openings 26 to facilitate the transport of the band saw 16 over the guide track surface. The amount of pressure used for the fluid whether hydraulic, air or a combination of these, will, of course, depend on the weight of the bandsaw and the tension under which it is operating as will be apparent to those skilled in this technology.

Figure 5:
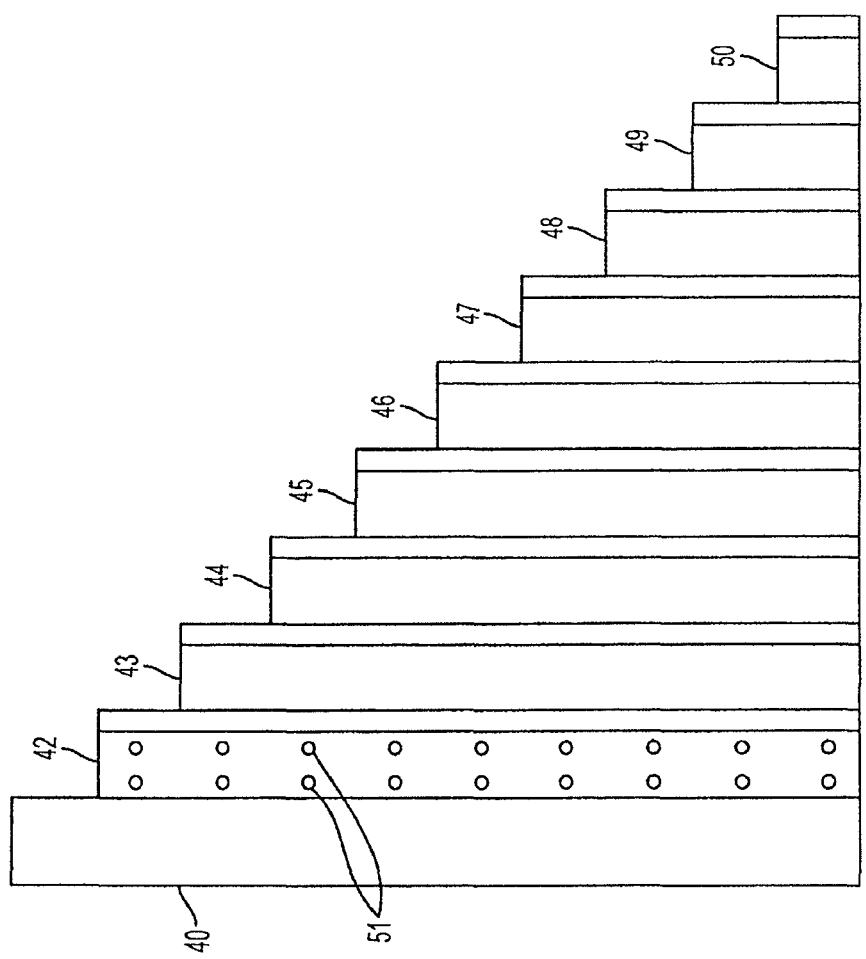
FIG. 5 is a side view is similar to that of FIG. 4 but showing additional guide tracks.

With reference to a FIGS. 4 and 5, there are shown alternative forms of the present invention where the guide member 12A is formed with a base 40 and a plurality of guide tracks 34 each of different radius relative to a center 32 and each will carry a separate band saw loop. Each guide track 34 is separated from an adjacent track by a wall member, one of which is indicated at 52. As will be apparent from FIG. 5, a large number of guide tracks, such as at 42-50, may be provided with decreasing radii from 42 to 50. This will have the effect of spatially separating the band saws at the wood cutting site. The corresponding drive wheel, mounted on base 14, need simply have the adequate axial width to accommodate the number of tracks for the number of band saws used. Also, each of the tracks 42-50 will be provided with either the grooves or openings in its surface described above in conjunction with FIGS. 1-3 to receive the pressurized hydraulic fluid and/or air but these features some of which are indicated at 51 but are omitted from the other tracks for the sake of clarity. The guide track surface in these embodiments is preferably made from case hardened steel and must be fixed rigidly on the post 18 to minimize or eliminate vibration during operation of the apparatus.

Figure 6A:
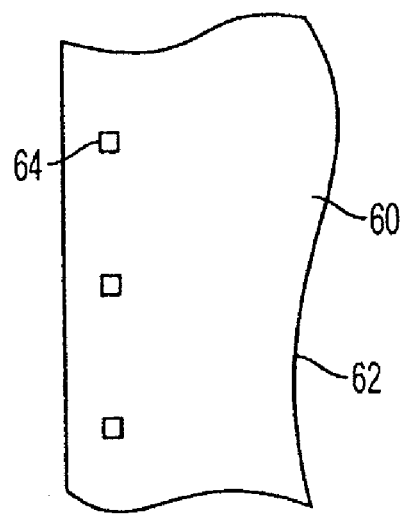
FIGS. 6A and 6B illustrate a schematic view of an improved band saw and a modified drive wheel, respectively.
Figure 6B:
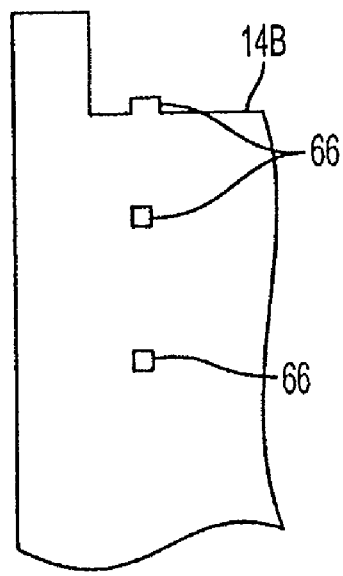

Referring to FIG. 6, there is shown a segment of a band saw 60 having the usual cutting teeth 62 along one edge and on the opposite edge there are provided sprocket holes 64 for cooperating with sprocket teeth 66 formed on the surface of a drive wheel 14B. With this arrangement in place, variations in tension in the band saws moving over the guide members 12 and 12A will be minimized.

Figure 7:
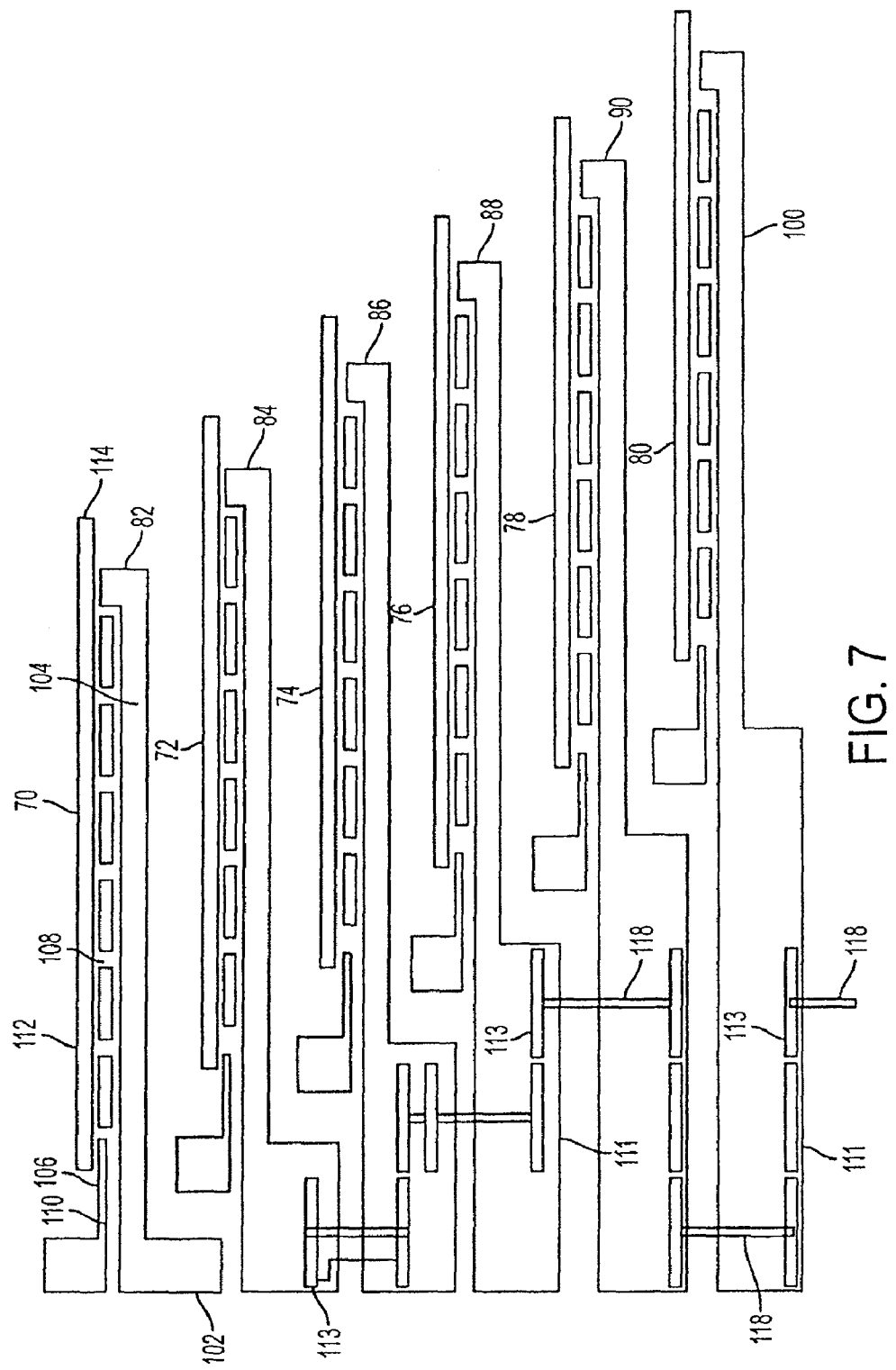
FIG. 7 is sectional view of a multiple path band saw slide arrangement where the individual track surfaces are independently adjustable relative to a common drive pulley and to each other to vary the size of the cut lumber pieces

In FIG. 7, a further arrangement is shown where each band saw 70, 72, 74, 78 and 80 is provided with a separate support slide 82, 84, 86, 88, 90 and 100. The slides 82, 84, 86, 88, 90 and 100 are substantially identical apart from the size of the mounting bases such as at 102 so that the following description will be understood to apply to each slide 82, 84, 86, 88, 90, and 100.

Slide 82 has an elongated arm 104 which has an upper slide surface 106 which is provided with a plurality of openings such as indicated at 108. The openings 108 are spaced across the surface 106 to underlie the band saw 112. The base member 102 is provided with a lubricant feed passage 110 which is supplied with a lubricant which may be mixed with air under pressure from a pump (not shown). The band saw 112 has its cutting edge extending beyond the end of arm 104 as shown at 114.

A mechanism for spacing the slides 82, 84, 86, 88, 90, and 100 may include a set of drive screws such as indicated at 118 each of which is connected to a gear system 111 rotatably carried in each base member 102 to permit selective rotation of the gears and activation of corresponding drive screws to change the spacing between the arms. Separate electric motors (not shown) may be used to control selected ones of the gears of the system to effect independent movement of the slides toward or away from each other. This can be accomplished by control circuitry of a conventional type to allow selective actuation of selected gears 113 of the system.

Having described the invention, it will be apparent to those skilled in this art that various modifications may be made therein without departing from the spirit and scope of this invention as defined in the accompanying claims.

What is claimed is:

1. An apparatus for moving a band saw comprising:
a plurality of endless, flexible loops having opposite side edges and a smooth body between said edges, at least one of said edges having cutting teeth thereon; and
a base supporting a drive wheel mounted on an axle at one location and a stationary curved guide positioned at a distance from said axle, said endless loops extending around a portion of said drive wheel and said curved guide so as to define a closed path of travel for said endless loops, wherein a part of said closed path includes a rectilinear section to allow access by a workpiece to said cutting teeth to accomplish cutting on said workpiece, said endless loops being in said rectilinear section so that the side edges having cutting teeth face a direction the workpiece is fed during operation, said drive wheel comprising a plurality of drive wheel tracks, each endless loop being in a corresponding drive wheel track and contacting a drive wheel track surface, said curved guide having a plurality of guide tracks, each endless loop being disposed in a corresponding guide track and contacting a guide track surface, the guide tracks having different radii measured from a common center so that the endless loops are spaced apart in the rectilinear section, the guide track surfaces comprising friction reducing means to facilitate movement of said endless loop over said guide track surface when said drive wheel is actuated to move said endless loop along said closed path, and wherein said smooth body of said endless loops includes a plurality of openings adjacent said edges and extending along said endless loops, and wherein said drive wheel tracks comprise sprocket lugs for engaging some of said openings in each of said endless loops to effect movement of said endless loops when said drive wheel is rotated.

2. The apparatus as claimed in claim 1 wherein said guide track surfaces are each provided with at least one groove extending along said guide track surfaces substantially in the direction of travel of said endless loop, said grooves having a lubricant feed opening for receiving a fluid lubricant under sufficient pressure to fill said grooves with lubricant at least during operation of said apparatus.

3. The apparatus as claimed in claim 2 wherein said guide track surfaces are provided with a plurality of said grooves with each said groove having a said lubricant feed opening.

4. The apparatus as claimed in claim 2 wherein said apparatus includes a lubricant supply source and a pump to move lubricant carried by said supply source to said lubricant feed opening in said grooves.

5. The apparatus as claimed in claim 1 wherein said guide track surface is formed from one of a metal, a metal alloy, or a synthetic plastic material.

6. The apparatus as claimed in claim 1 wherein said endless loop is a metallic band.

7. The apparatus as claimed in claim 1 further including a motor for rotating said drive wheel.

8. The apparatus as claimed in claim 1 wherein each guide track surface having at least one groove formed therein and an opening for receiving a lubricant under pressure supplied from a source.

9. The apparatus according to claim 1, wherein the apparatus is free of a rotatable idler pulley.

* * * * *